United States Patent

Kasai et al.

Patent Number: 5,549,725
Date of Patent: Aug. 27, 1996

[54] CORDIERITE CERAMIC FILTER

[75] Inventors: Yoshiyuki Kasai; Kazuhiko Kumazawa, both of Nagoya; Wataru Kotani, Kasugai, all of Japan

[73] Assignee: NGK Insulators, Ltd., Japan

[21] Appl. No.: 354,490

[22] Filed: Dec. 12, 1994

[30] Foreign Application Priority Data

Dec. 14, 1993 [JP] Japan .................................. 5-313031

[51] Int. Cl.$^6$ ........................... B01D 39/20; C04B 35/64
[52] U.S. Cl. ..................... 55/523; 55/DIG. 30; 60/311; 210/510.1
[58] Field of Search ............... 55/523, DIG. 30, 55/355.3; 60/311; 210/510.1

[56] References Cited

U.S. PATENT DOCUMENTS

| | | | |
|---|---|---|---|
| 4,364,761 | 12/1982 | Berg et al. | 55/523 |
| 4,417,908 | 11/1983 | Pitcher, Jr. | 55/523 |
| 4,455,180 | 6/1984 | Hillman et al. | 55/523 |
| 4,464,185 | 8/1984 | Tomita et al. | 55/523 |
| 4,857,089 | 8/1989 | Kitagawa et al. | 55/523 |
| 4,869,944 | 9/1989 | Harada et al. | 55/523 |
| 4,976,760 | 12/1990 | Helferich et al. | 55/523 |
| 5,069,697 | 12/1991 | Hamaguchi et al. | 55/523 |
| 5,080,953 | 1/1992 | Horikawa et al. | 55/523 |

FOREIGN PATENT DOCUMENTS

| | | |
|---|---|---|
| 89751 | 9/1983 | European Pat. Off. . |
| 232621 | 8/1987 | European Pat. Off. . |
| 260704 | 3/1988 | European Pat. Off. . |
| 354721 | 2/1990 | European Pat. Off. . |
| 3541372 | 6/1986 | Germany . |
| 60-2272 | 1/1985 | Japan . |
| 61-129015 | 6/1986 | Japan . |
| 63-31517 | 2/1988 | Japan . |
| 3-68411 | 3/1991 | Japan . |

*Primary Examiner*—Jay H. Woo
*Assistant Examiner*—Duane S. Smith
*Attorney, Agent, or Firm*—Parkhurst, Wendel & Burr

[57] ABSTRACT

A cordierite ceramic filter is formed by mixing cordierite powders having a porosity of more than 30% as aggregate with raw materials for cordierite generation, poring agents, forming agents and solvents to obtain a ceramic batch, extruding the ceramic batch into a honeycomb shape to obtain a formed body, and firing the formed body. The cordierite ceramic filter has a mean pore size in a range of aggregate mean size×0.15±5 μm, has a porosity of more than 30% and has a compressive strength more than 100 kgf/cm$^2$ in a direction parallel to a flow passage. The cordierite ceramic filter has an excellent filter regeneration function, has a high mechanical strength and is light and compact.

4 Claims, 3 Drawing Sheets

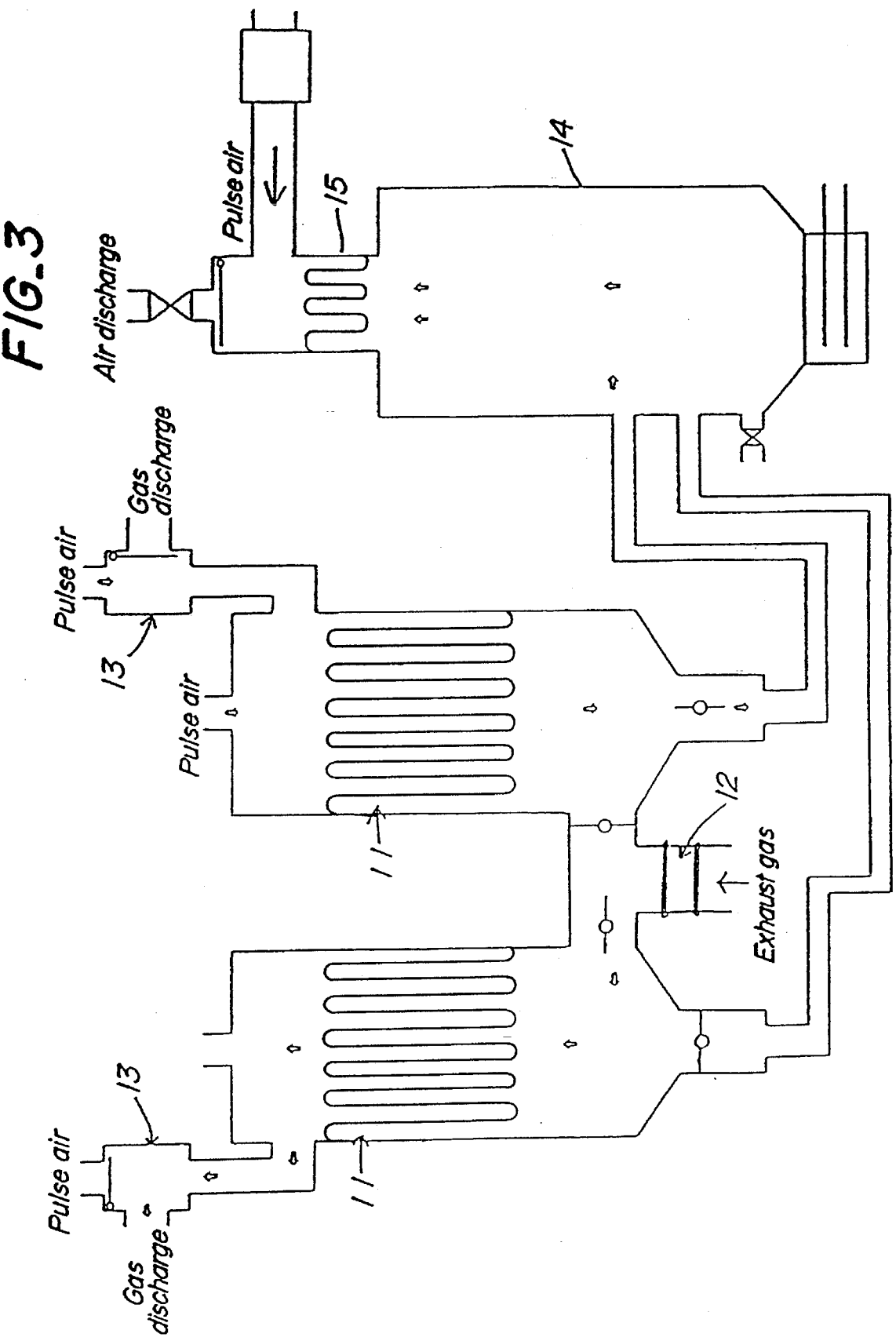

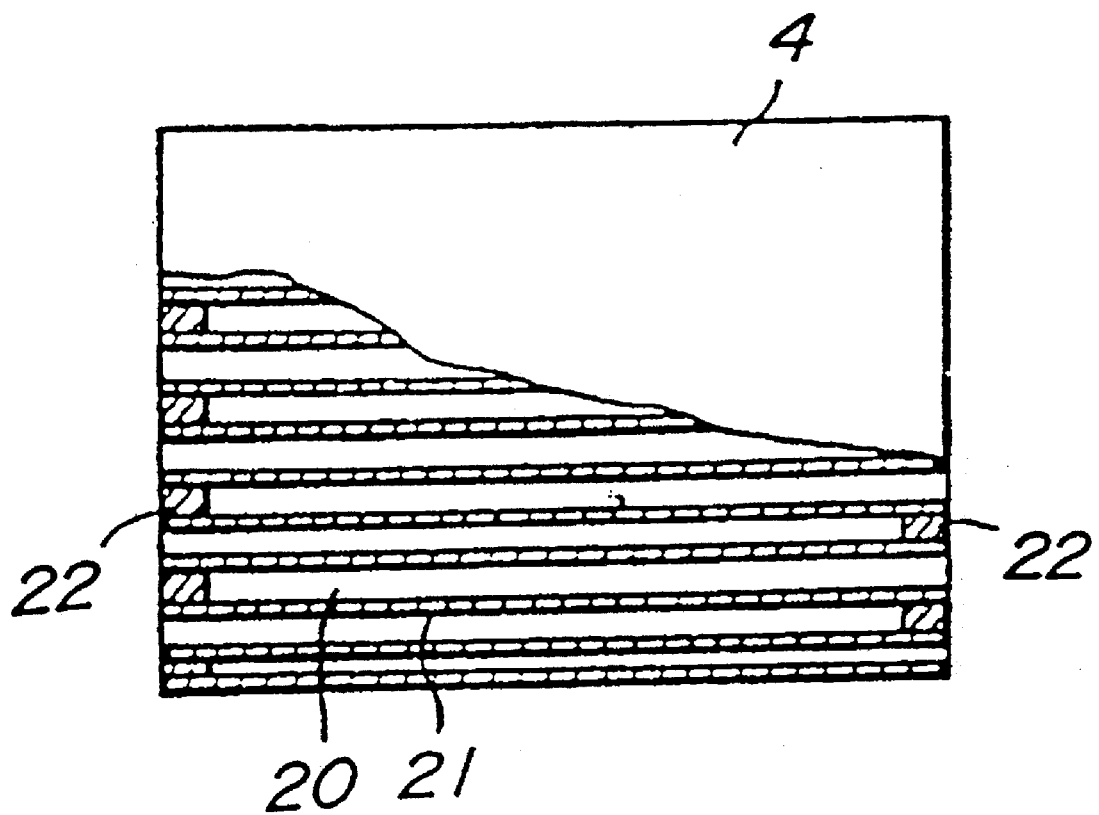
FIG_4

CORDIERITE CERAMIC FILTER

BACKGROUND OF THE INVENTION

1. Field of the Invention

The present invention relates to a cordierite ceramic filter to be used at high temperatures, and a method of producing the same.

2. Related Art Statement

Recently, as for porous ceramic filters, various types of porous honeycomb filters have been known, wherein filtration is performed by passing a fluid such as gas through partition walls of a honeycomb structural body made of cordierite. Since cordierite has an excellent heat resistance as compared with other materials, the cordierite honeycomb is used as a catalyst carrier in automobiles and so on, which needs an excellent thermal shock resistance.

In the known cordierite ceramic filter especially used for collecting fine particles in an exhaust gas supplied from a diesel engine, since a filter regeneration is performed by firing the collected fine particles in the ceramic filter, the cordierite ceramic filter is not used stably for long time period due to a deterioration or melt down thereof. In order to eliminate the drawbacks mentioned above, it is disclosed that a filter regeneration is performed by using a reverse pulse air. However, the filter regeneration method mentioned above has various drawbacks such that filter regeneration efficiency is not sufficient, an apparatus for performing the filter regeneration method has insufficient mechanical strength for being assembled in automobiles, and thus a total system for performing the filter regeneration method must be large to improve the insufficient efficiency and mechanical strength mentioned above.

The known cordierite ceramic filter is produced by mixing raw materials such as talc, kaolin, alumina and so on with forming agents to obtain a ceramic batch, extruding the ceramic batch to obtain a honeycomb structural green body, firing the honeycomb structural green body to obtain a honeycomb structural body, and sealing both ends of the honeycomb structural body in a checker pattern, wherein, if one end of a flow passage is closed, the other end of the flow passage is open. Japanese Patent Laid-open Publication No. 61-129015 (JP-A-61-129015) discloses a method for improving the filter efficiency such that pores existent in a surface of a filter partition wall are controlled to satisfy a ratio of (the number of small pores having a diameter of 5–40 µm):(the number of large pores having a diameter of 40–1000 µm) in a range of 1:51:40. However, this method is developed for filter regeneration by firing but not for filter regeneration by reverse pulse air. Therefore, even if filter regeneration by using reverse pulse air is applied to the filter disclosed in JP-A-61-129015, sufficient filter regeneration cannot be performed.

As for a filter to which filter regeneration by using reverse pulse air is applied, Japanese Patent Laid-open Publication No. 63-31517 (JP-A-63-31517) discloses a method of producing a ceramic filter by mixing one or more than two kinds of ceramic fine powders selected from the group of cordierite, β-spodumene, aluminum titanate, mullite, zirconia, silicon carbide and silicon nitride with clay or frit as a binder to obtain ceramic batches, and firing the ceramic batches. However, the ceramic filter formed according to the method mentioned above cannot obtain sufficient mechanical strength and cannot perform filter regeneration by using reverse pulse air. Therefore, the ceramic filter mentioned above cannot be preferably used in automobiles which need a long particle operating time.

In order to obtain a ceramic body having an isotropic thermal expansion, Japanese Patent Publication No. 60-2272 (JP-B-60-2272) discloses a method of producing a cordierite body by mixing predetermined synthesized cordierite powders having an undetermined shape and raw materials for cordierite generation to obtain mixtures having a theoretical cordierite composition, forming the mixtures to obtain a formed body, and sintering the formed body. This method is for a catalyst carrier, and thus it is effective in providing the ceramic body with excellent heat resistivity. However, it is not sufficient for the ceramic filter which needs an excellent trapping efficiency, since it does not disclose a porosity and a particle size of cordierite powders.

Japanese Patent Laid-open Publication No. 3-68411 (JP-A-3-68411) discloses a method of producing the ceramic filter showing a small pressure loss and a sufficient mechanical strength for a real use by using densified cordierite having a suitable particle size as aggregates. However, according to the method mentioned above, in order to densify the aggregates, it is necessary to fire cordierite powders having high porosity and to add LAS raw materials. Therefore, producing steps increase extraordinarily.

SUMMARY OF THE INVENTION

An object of the present invention is to eliminate the drawbacks mentioned above and to provide a cordierite ceramic filter and a method of producing the same, which cordierite ceramic filter shows an excellent filter regeneration function, has a high mechanical strength, and is light and compact.

According to the invention, a cordierite ceramic filter for separating a solid phase from a fluid is characterized in that said filter is formed by cross-linked ceramic aggregates made of cordierite; has a partition wall having a honeycomb shape, which defines flow passages; is sealed like a checker pattern at both ends wherein, if one end of one flow passage is closed, the other end of said flow passage is opened; has a mean pore size in a range of aggregate mean size×0.15±5 µm; has a porosity of more than 30%; and has a compressive strength of more than 100 kgf/cm$^2$ in a direction parallel to said flow passage.

According to the invention, a method of producing a cordierite ceramic filter, comprises the steps of mixing 100 parts by weight of cordierite powders having a porosity of more than 30% as aggregates, 5–30 parts by weight of raw materials for cordierite generation as cross-link agents for said aggregates, and less than 30 parts by weight of poring agents with forming agents and solvents to obtain a ceramic batch; extruding said ceramic batch into a honeycomb shape to obtain a formed body; and firing said formed body.

BRIEF DESCRIPTION OF THE DRAWINGS

FIG. 3 is a schematic view depicting one example of an apparatus for measuring filter characteristics; and FIG. 4 is a side elevational view in partial cross-section of the filter according to the present invention.

DESCRIPTION OF THE PREFERRED EMBODIMENT

Since a ceramic filter according to the invention uses cordierite ceramics as a filter aggregate, the ceramic filter according to the invention can endure a high temperature engine exhaust gas.

In the ceramic filter 4, a number of flow passages 20 (FIG. 4) are formed by partition walls 21 having a honeycomb shape. Both ends of the ceramic filter are sealed like a checker pattern, as shown in FIG. 4, by sealing members 22. If one end of each flow passage is open, the other end of this flow passage is closed. Exhaust gasses are introduced from open flow passages, pass through the partition wall made of porous materials mentioned below, and discharge from the filter through adjacent flow passages of the gas introduced flow passages. Since the exhaust gasses are passed through the partition wall, dust particles included in the exhaust gasses are collected by the partition wall. In the ceramic filter mentioned above, since the partition wall has a honeycomb shape, it is possible to increase filter areas per unit volume, which contribute to the particle collection.

Figure 2:
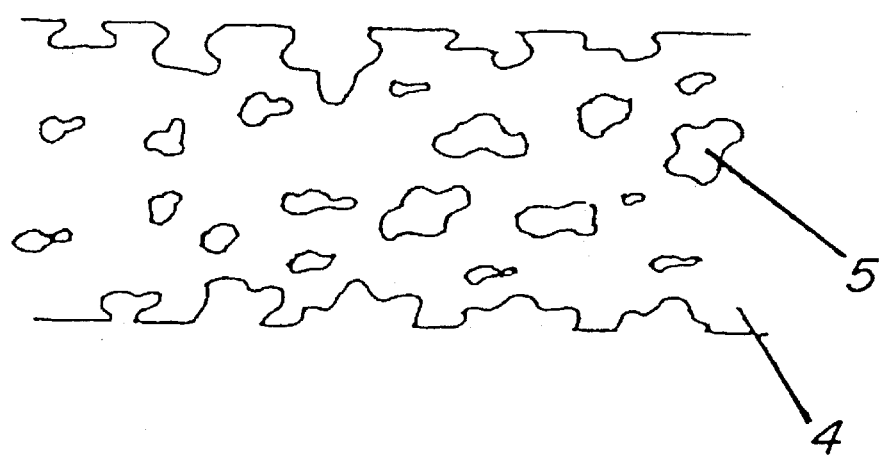
FIG. 2 is a cross sectional view illustrating a typical structure of a conventional cordierite ceramic filter.

If the ceramic filter is produced from raw materials for cordierite generation only, pores 5 in the filter 4 are not continued as shown in FIG. 2, which shows a conventional example. This is because pores are generated due to talc and silica included in the raw materials for cordierire generation, and thus particle shapes of talc and silica remain as they are. If such discontinuous pores remain, a filter regeneration by a reverse pulse air is not performed sufficiently, and thus a pressure loss is increased corresponding to lapse of time. Therefore, it is not possible to obtain a ceramic filter having uniform characteristics.

Figure 1:
FIG. 1 is a cross sectional view showing a typical structure of a cordierite ceramic filter according to the invention.

In the ceramic filter according to the invention, in order to increase mechanical strength, use is made of cordierite particles as aggregates, and cordierite particles are cross-linked by raw materials for cordierite generation. Therefore, pores 2, 3 generated between aggregates made of cordierite particles 1 show excellent continuity as shown in FIG. 1, and thus it is easy to regenerate the ceramic filter by using a reverse pulse air. As mentioned above, in the ceramic filter according to the invention, if a porosity of the overall ceramic filter is more than 30%, the ceramic filter has a sufficient mechanical strength such as a compressive strength of more than 100 kgf/mm$^2$ in a direction parallel to the flow passage. Moreover, such a ceramic filter improves a filtering rate, decreases pressure loss and has sufficient operating time for a real use.

Contrary to this, if a pore continuity and a porosity increase are made much in excess, mechanical strength is decreased since cross-linkings between aggregates are not sufficient. The inventors discovered that, if a mean pore size of the ceramic filter is set in a range of aggregate size× 0.15±5 µm, it is possible to obtain a ceramic filter having excellent pore continuity and also excellent mechanical strength, which ceramic filter is preferably used for filter regeneration by using a reverse pulse air. That is to say, if the mean pore size is not less than aggregate size×0.15+5 µm, dust particles are passed through the partition wall, and thus trapping efficiency is decreased or mechanical strength of the partition wall is decreased. Moreover, if the mean pore size is not more than aggregate size×0.15–5 µm, pressure loss is increased and pore continuity is affected. Therefore, in this case, the filter regeneration property is affected.

In the preferable embodiment of the ceramic filter according to the present invention, a thickness of the partition wall is set in a range of 300–2000 µm. If a thickness of the partition wall is too small, it is difficult to form a honeycomb structural body. Moreover, there occurs various problems such that mechanical strength is insufficient and particle trapping efficiency decreases, and thus it is necessary to perform the filter regenerating operation frequently. Moreover, if a thickness of the partition wall is too large, pressure loss is increased, and filter area per unit volume (hereinafter, called as volume efficiency) is decreased.

Open frontal area ratio defined by a ratio of open cell area and total area on a cross section of the ceramic filter is an influence on volume efficiency of the filter, mechanical strength, pressure loss and so on together with outer diameter of the filter, density of the flow passages, thickness of the partition wall and so on. In the ceramic filter according to the present invention, it is preferred to set the open frontal area ratio in a range of 63–71%. Moreover, if use is made of cordierite powders having a porosity of more than 30% as aggregates, pores included in the cordierite powders serve as pores between aggregates in the case of firing shrinkage during firing, and thus pores having excellent continuity can be obtained.

Mean particle size of the cordierite powders as aggregates is preferably set in a range of 5–450 µm, and it is also preferred to set this mean particle size to a value less than 20% of a slit width of the extrusion die. Thereby, cordierite powders can be compacted sufficiently in the case of extruding operation, so that formability of the honeycomb body becomes better and mechanical strength is improved. If the mean particle size of the cordierite powder is not less than 20% of slit width of the extrusion die, the honeycomb body is not preferably formed, and in an extreme case, the extrusion die is deformed.

Moreover, cordierire is not easy to sinter. Therefore, mechanical strength is not sufficient, if cordierite powders are only fired. In a method of producing a cordierite ceramic filter according to the invention, in order to cross-link the cordierite powders, 5–30 parts by weight of raw materials for cordierite generation are added as cross-link agents with respect to 100 parts by weight of aggregates.

As for the raw materials for cordierite generation, use is made of mixtures which are obtained by mixing talc, kaolin, alumina, silica and so on to be a cordierite composition. It is preferred to use raw materials for cordierire generation such that, if they are fired only, the fired body has a porosity of more than 35%. Moreover, since raw materials for cordierite generation have excellent thermal expansion properties, heat stable properties and chemical stable properties, they serve effectively as the cross-link agents due to liquid phase reactions, and also serve for improving pore continuity. However, if an amount of raw materials for cordierire generation is in excess, pores are closed like an ink pot shape. In this case, continuity between pores is deteriorated, and thus filter regeneration property is decreased. In the cordierite ceramic filter according to the invention, since a predetermined amount of raw materials for cordierite generation is added as cross-link agents, it is possible to obtain a sintered body having excellent filter regeneration property and excellent mechanical strength.

Poring agents are used to form pores in the sintered body by oxidizing and vaporizing them in the case of firing. For example, as for the poring agents, use is made of carbon powders each having a suitable dimension, polyurethane adhesives and so on. In the method of producing the cordierite ceramic filter according to the present invention, it is necessary to add less than 30 parts by weight of the poring agents with respect to 100 parts by weight of the aggregates.

Forming agents and solvents are used to support a mixing operation and an extruding operation of the raw materials, and use is made of normal forming agents for use in a ceramic powder extrusion. As for the forming agents, use is made of methylcellulose, diethylene glycol stearate and so on. Kinds and amounts of the forming agents can be selected freely, but it is preferred to add more than 3 parts by weight of total agents with respect to 100 parts by weight of the aggregates.

Firing temperature of the ceramic honeycomb formed body is selected in a temperature range above a temperature at which raw materials for cordierite generation start to fire below a melting temperature of cordierite. If the firing temperature is too high, aggregates become glass and thus thermal expansion coefficient is increased. It is preferred to fire in a temperature range of 1350°–1430° C. It should be noted that the checker pattern sealing of both ends of the filter is performed anytime before or after firing the ceramic formed body.

Hereinafter, the present invention will be explained in detail with reference to actual examples.

EXAMPLE 1

As for aggregates, cordierite powders each having compositions and properties shown in Table 1 were prepared. As for raw materials for cordierite generation, raw materials each having compositions shown in Table 2 were mixed in a ratio shown in Table 2. As for poring agents, use was made of graphite. Then, the thus prepared aggregates, raw materials for cordierite generation and poring agents were mixed as shown in Table 3 to obtain ceramic batches for extrusion. In this mixing step, 10 parts by weight of methylcellulose and 3 parts by weight of diethylene glycol stearate were added as forming agents with respect to 100 parts by weight of the mixtures. Moreover, in this mixing step, water was also added as a solvent.

By using a extrusion die having an dimension of slit width: 330 μm and 38 cells per square cm, the thus prepared ceramic batches were extruded to obtain ceramic honeycomb formed bodies each having a dimension of diameter: 130 mm and length: 170 mm. Then the thus obtained ceramic honeycomb formed bodies were fired at 1400° C. to obtain ceramic honeycomb bodies. After the firing, both ends of the ceramic honeycomb body were sealed like checker pattern to obtain filter samples.

Then, thickness of partition wall and the number of cells were measured with respect to the thus obtained filter samples. Moreover, porosity measurement by using a boiling method and pore measurement by using a mercury-porosimeter were performed. Moreover, cylindrical samples each having a diameter of 25.4 mm and a length of 25.4 mm

TABLE 1

| Kind of cordierite powders | Composition (wt %) | | | | | Average particle size (μm) | Porosity (%) |
| --- | --- | --- | --- | --- | --- | --- | --- |
| | MgO | $Al_2O$ | $SiO_2$ | CaO | NaO | | |
| A | 13.7 | 35.5 | 50.5 | 0.1 | 0.2 | 65 | 30 |
| B | 13.7 | 35.5 | 50.6 | 0.1 | 0.1 | 70 | 30 |
| C | 13.7 | 35.5 | 50.5 | 0.1 | 0.2 | 65 | 25 |
| D | 13.7 | 35.4 | 50.6 | 0.1 | 0.2 | 66 | 40 |
| E | 13.7 | 35.4 | 50.6 | 0.1 | 0.2 | 430 | 30 |
| F | 13.7 | 35.5 | 50.5 | 0.1 | 0.2 | 55 | 30 |

TABLE 2

| Kind of raw materials | Composition (wt %) | | | | | | Mixing ratio (%) |
| --- | --- | --- | --- | --- | --- | --- | --- |
| | Ig-loss | MgO | $Al_2O_3$ | $SiO_2$ | $TiO_2$ | $Fe_2O_3$ | |
| Talc | 5.7 | 30.7 | 1.2 | 60.9 | — | 1.0 | 40.0 |
| Kaolin | 13.9 | — | 38.6 | 45.5 | 0.8 | 0.4 | 25.0 |
| Calcined kaolin | 0.1 | — | 45.1 | 53.1 | 0.8 | 0.4 | 21.0 |
| Alumina | 0.3 | — | 99.4 | — | — | — | 14.0 |

TABLE 3

| Sample No. | Kind of cordierite powders | Cordierite powder (wt %) | Raw materials for cordierite generation (wt %) | Poring agents (wt %) | Thickness of partition wall (μm) | Mean aggregate size (μm) | Porosity (%) | Mean pore size (μm) | Compressive strengh (kgf/mm$^2$) | Pressure loss (mmH$_2$O) | Trapping efficiency (%) | Reverse flow pressure (mmH$_2$O) |
| --- | --- | --- | --- | --- | --- | --- | --- | --- | --- | --- | --- | --- |
| Present invention | | | | | | | | | | | | |
| 1 | A | 95 | 5 | — | 301 | 60 | 30.2 | 4.1 | 115.2 | 250 | 99.0 | 380 |
| 2 | A | 95 | 5 | 30 | 302 | 59 | 40.4 | 9.5 | 105.5 | 215 | 93.8 | 340 |
| 3 | A | 70 | 30 | — | 300 | 60 | 32.1 | 7.1 | 121.8 | 205 | 95.0 | 550 |
| 4 | A | 70 | 30 | 30 | 302 | 58 | 41.9 | 11.9 | 108.0 | 193 | 91.2 | 505 |
| 5 | D | 95 | 5 | — | 303 | 56 | 37.0 | 9.2 | 113.2 | 210 | 97.0 | 360 |
| Reference example | | | | | | | | | | | | |
| 1 | — | — | 100 | — | 302 | — | 40.0 | 15.7 | 152.0 | 180 | 91.0 | 610 |
| 2 | A | 100 | — | — | 300 | 60 | 27.2 | 2.9 | 98.0 | 260 | 99.5 | 350 |
| 3 | A | 95 | 5 | 40 | 302 | 58 | 44.2 | 10.2 | 99.0 | 204 | 88.7 | 320 |
| 4 | A | 70 | 30 | 40 | 303 | 59 | 45.3 | 12.6 | 98.0 | 178 | 86.0 | 490 |
| 5 | A | 60 | 40 | 40 | 301 | 58 | 46.0 | 14.3 | 103.0 | 155 | 80.3 | 540 |
| 6 | B | 70 | 30 | — | (not formed) | | — | — | — | — | — | — |
| 7 | C | 70 | 30 | 30 | 298 | 61 | 36.9 | 4.1 | 116.0 | 233 | 96.0 | 580 |
| 8 | C | 95 | 5 | 30 | 299 | 62 | 32.0 | 3.8 | 108.5 | 252 | 97.6 | 380 | were cut out from the filter samples, and a compressive strength of the cylindrical sample along a direction parallel to the flow passage was measured. Further, a diameter of the aggregate was measured by using scanning electron microscope (SEM).

By using a measuring apparatus shown in FIG. 3, property of filter regeneration by using reverse pulse air and pressure loss were measured under the condition of exhaust gas flow rate: 3 m$^3$/minute, reverse pulse air pressure: 6 kgf/cm$^2$, pulse interval: 0.5 second. Measured results were shown in Table 3. In Table 3, the trapping efficiency was indicated by a ratio of an amount of collected particles in a collection tank 14 for three hours from the start of examination and an amount of generated particles for the same time duration. After three hours, the trapping efficiency value was increased or maintained. Moreover, the property of filter regeneration was indicated by a pressure loss after three hours from the start of examination measured by using a pressure loss measuring apparatus 12 shown in FIG. 3. In the property of filter regeneration, excellent property was indicated by a small pressure loss value and inferior property was indicated by a large pressure loss value.

From Table 3 it is understood that the filter samples having a porosity of more than 30% and a filter pore size of aggregate size×0.15±5 μm show excellent pressure loss and excellent property of filter regeneration. Moreover, the filter samples having a filter pore size of less than aggregate size×0.15−5 μm show a large pressure loss, and thus it is clearly understood that, if is such a filter assembled in an the engine, a load of engine is increased. Further, the filter samples having a filter pore size of more than aggregate size×0.15+5 μm show low trapping efficiency, and thus it is understood that an effective filter cannot be achieved. Furthermore, the filter samples having a porosity of not more than 30% show large pressure loss.

Moreover, it is understood that the filter samples showing excellent properties are produced under such a condition that use is made of cordierite powders having a porosity of more than 30% as aggregates, and 5–30 parts by weight of raw materials for cordierite generation and less than 30 parts by weight of poring agents are added. If an amount of raw materials for cordierite generation is not more than 5 parts by weight, compressive strength is decreased due to insufficient cross-linkings between aggregates, and also pressure loss is increased. If an amount of raw materials for cordierite generation is not less than 30 parts by weight, compressive strength is increased due to sufficient cross-linking, but a pore discontinuous state shown in FIG. 2 is generated. Therefore, property of filter regeneration becomes worse. Moreover, if an amount of poring agents is not less than 30 parts by weight, porosity is increased, but compressive strength is decreased since cross-linkings between aggregates are affected by an increase of porosity.

EXAMPLE 2

Filter samples were produced according to the same producing method shown in Example 1 except for slit width and cell structure. Kinds and amounts of cordierite powders, amounts of raw materials for cordierite generation and poring agents, and measured properties were shown in Table 4.

TABLE 4

| Sample No. | Kind of cordierite powders | Cordierite powder (wt %) | Raw materials for cordierite generation (wt %) | Poring agents (wt %) | Thickness of partition wall (μm) | Mean aggregate size (μm) | Number of cells (piece/cm$^2$) | Open frontal area ratio (%) | Porosity (%) | Mean pore size (μm) | Compressive strengh (kgf/mm$^2$) | Pressure loss (mmH$_2$O) |
| --- | --- | --- | --- | --- | --- | --- | --- | --- | --- | --- | --- | --- |
| Present invention | | | | | | | | | | | | |
| 2 | A | 95 | 5 | 30 | 302 | 59 | 31.0 | 70.8 | 40.4 | 9.5 | 105.5 | 215 |
| 6 | A | 95 | 5 | 30 | 301 | 59 | 46.5 | 63.3 | 40.5 | 9.6 | 128.4 | 252 |
| 7 | A | 95 | 5 | 30 | 2003 | 59 | 0.6 | 71.0 | 40.3 | 9.5 | 105.3 | 255 |
| 8 | A | 95 | 5 | 30 | 434 | 59 | 15.1 | 68.9 | 40.5 | 9.4 | 113.6 | 220 |
| Reference example | | | | | | | | | | | | |
| 9 | A | 95 | 5 | 30 | 300 | 60 | 15.5 | 77.8 | 40.3 | 9.4 | 78.1 | 180 |
| 10 | A | 95 | 5 | 30 | 300 | 60 | 62.0 | 58.3 | 40.4 | 9.4 | 144.7 | 268 |
| 11 | A | 95 | 5 | 30 | 2098 | 59 | 0.6 | 69.7 | 40.4 | 9.4 | 106.5 | 264 |
| 12 | E | 95 | 5 | 30 | 2001 | 398 | 0.6 | 70.8 | 43.2 | 60.4 | 100.3 | 240 |
| 13 | F | 95 | 5 | 30 | 250 | 49 | 62.0 | 64.5 | 37.3 | 7.8 | 98.0 | 240 |

From the results shown in Table 4, it is understood that the filter samples having a thickness of partition wall of not less than 2000 μm show a large pressure loss, and the filter samples having a thickness of partition wall of not more than 300 μm show a decrease of compressive strength which does not satisfy a strength level to be assembled in an engine. Moreover, if thickness of partition wall of the filter samples is in a range of 300–2000 μm, the filter samples having an open frontal area ratio on a cross section of not more than 63% show an excellent trapping efficiency (no data) and a sufficient compressive strength, but their pressure losses are increased to an extent not acceptable for real use. Further, in this case, if an open frontal area ratio on a cross section is not less than 71%, compressive strength is decreased, and filter effective area becomes smaller. Therefore, such filter having a large open frontal area ratio mentioned above is also not acceptable for real use.

As mentioned above, according to the present invention relating to a cordierite ceramic filter and a method of producing the same, it is possible to obtain a cordierite ceramic filter having excellent trapping efficiency, small pressure loss, light weight and compact characteristics, excellent property of filter regeneration and strength sufficient to assemble in a motorcycle.

What is claimed is:

1. A ceramic honeycomb filter for separating a solid phase from a fluid, comprising:

cordierire aggregates bonded to one another in the form of a honeycomb structure having an inlet side, an outlet side, and a plurality of longitudinal, intersecting partition walls extending from said inlet side to said outlet side and defining a plurality of flow passages; and sealing means for closing alternate ends of said flow passages, such that flow passages open on said inlet side are closed on said outlet side and flow passages open on said outlet side are closed on said inlet side;

wherein said filter has (i) a mean pore size ranging from {0.15 (mean aggregate size)−5 µm} to {0.15 (mean aggregate size)+5 µm}, (ii) a porosity of at least 30%, and (iii) a compressive strength of at least 100 kgf/cm$^2$ in a direction parallel to said flow passages.

2. The ceramic honeycomb filter of claim 1, wherein a thickness of said partition walls is in a range of 300–2000 µm.

3. The ceramic honeycomb filter of claim 1, wherein an open frontal area at a cross section of said filter is in a range of 63–71%.

4. The ceramic honeycomb filter of claim 2, wherein an open frontal area at a cross section of said filter is in a range of 63–71%.

* * * * *